(12) United States Patent
Bodman et al.

(10) Patent No.: US 9,477,957 B2
(45) Date of Patent: Oct. 25, 2016

(54) SYSTEMS AND METHODS FOR TRANSFERRING VALUE TO PAYMENT ACCOUNTS

(71) Applicant: MASTERCARD INTERNATIONAL INCORPORATED, Purchase, NY (US)

(72) Inventors: Ryan Bodman, Louisville, KY (US); Stephen Parento, White Plains, NY (US); Matthew Lanford, New York, NY (US); Claire Dudley-Hodson, Warwickshire (GB)

(73) Assignee: MASTERCARD INTERNATIONAL INCORPORATED, Purchase, NJ (US)

( * ) Notice: Subject to any disclaimer, the term of this patent is extended or adjusted under 35 U.S.C. 154(b) by 0 days.

(21) Appl. No.: 14/479,941

(22) Filed: Sep. 8, 2014

(65) Prior Publication Data

US 2016/0071092 A1    Mar. 10, 2016

(51) Int. Cl.
*G06Q 20/34* (2012.01)
*G06Q 20/40* (2012.01)
*G06Q 20/32* (2012.01)
*G06Q 20/38* (2012.01)

(52) U.S. Cl.
CPC ............ *G06Q 20/349* (2013.01); *G06Q 20/32* (2013.01); *G06Q 20/34* (2013.01); *G06Q 20/387* (2013.01); *G06Q 20/409* (2013.01)

(58) Field of Classification Search
CPC ..................................................... G06Q 40/00
USPC ....... 235/380, 449; 705/14.35, 14.17, 17, 35
See application file for complete search history.

(56) References Cited

U.S. PATENT DOCUMENTS

| | | | |
|---|---|---|---|
| 2006/0004656 A1 | 1/2006 | Lee | |
| 2006/0167780 A1* | 7/2006 | Friedman | G06Q 40/00 705/35 |
| 2007/0078710 A1* | 4/2007 | Bender, II | G06Q 30/02 704/14.17 |
| 2007/0288313 A1 | 12/2007 | Brodson et al. | |
| 2008/0046366 A1 | 2/2008 | Bemmel et al. | |
| 2008/0167017 A1 | 7/2008 | Wentker et al. | |
| 2008/0249928 A1 | 10/2008 | Hill et al. | |
| 2008/0257958 A1* | 10/2008 | Rothwell | G06Q 20/20 235/380 |

(Continued)

OTHER PUBLICATIONS www.paysafecard.com/en-us/products/paysafecard; accessed Jan. 14, 2015; 2 pgs.

(Continued)

*Primary Examiner* — Allyson Trail
(74) *Attorney, Agent, or Firm* — Harness, Dickey & Pierce, P.L.C.

(57) ABSTRACT

Systems and methods are provided for transferring value from a voucher to a payment account associated with a consumer. One exemplary method includes receiving, at a computing device, a load request to transfer value from a voucher to a payment account associated with a consumer. The load request includes a selection, at the computing device, of a provider associated with the voucher, from multiple different available voucher providers. A transaction request is then communicated, by the computing device, to transfer the value from the voucher to the payment account. The transaction request includes an identification number for the voucher and an account number for the payment account. When a transfer authorization is received at the computing device in response to the transaction request, a confirmation is generated, by the computing device, indicating that the value from the voucher has been transferred to the payment account.

20 Claims, 4 Drawing Sheets

(56) References Cited

U.S. PATENT DOCUMENTS

| | | |
|---|---|---|
| 2010/0042538 A1 | 2/2010 | Dheer et al. |
| 2011/0295750 A1 | 12/2011 | Rammal |
| 2011/0320358 A1 | 12/2011 | Harris et al. |
| 2013/0018785 A1 | 1/2013 | Dolphin et al. |
| 2013/0036048 A1 | 2/2013 | Campos et al. |
| 2013/0132217 A1* | 5/2013 | Yahn .................. G07F 17/26 705/17 |
| 2013/0144738 A1 | 6/2013 | Qawami et al. |
| 2013/0317926 A1 | 11/2013 | Leeds et al. |
| 2014/0067565 A1* | 3/2014 | Brown .................. G06Q 20/20 705/17 |
| 2014/0081839 A1 | 3/2014 | Blackhurst et al. |
| 2014/0136351 A1* | 5/2014 | Lennon .................. G06Q 20/12 705/18 |
| 2014/0222591 A1 | 8/2014 | Baradoy et al. |
| 2014/0358779 A1 | 12/2014 | El-Sakka |
| 2014/0372301 A1 | 12/2014 | Anamanamuri |
| 2015/0262160 A1* | 9/2015 | Hursta .................. G06Q 20/227 705/14.51 |

OTHER PUBLICATIONS www.ukash.com/en-zz/about-ukash; accessed Jan. 14, 2015; 1 pg.
U.S. Appl. No. 14/595,696, filed Jan. 13, 2015, Gupta et al.

* cited by examiner

SYSTEMS AND METHODS FOR TRANSFERRING VALUE TO PAYMENT ACCOUNTS

FIELD

The present disclosure generally relates to systems and methods for transferring value to payment accounts, for example, from vouchers, etc.

BACKGROUND

This section provides background information related to the present disclosure which is not necessarily prior art.

Payment cards are often used by consumers in transactions with merchants to purchase goods and services. Pre-paid type payment cards allow the consumers to load predetermined monetary values onto the cards, and then later use the values in the transactions with the merchants. When the monetary values on the pre-paid cards are depleted, the consumers must reload the cards prior to further use. Separately, vouchers are often used by consumers in payment transactions to purchase goods or services. The vouchers can represent various different values for use in the payment transactions, for example, cash, service credits, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Pre-paid cards are often used by consumers in payment transactions with merchants. However, prior to initiating such transactions, monetary value must be loaded onto the pre-paid cards (specifically, into accounts associated with the pre-paid cards). This can be done at merchants, using point of sale terminals, where consumers can provide cash to the merchants in exchange for loading value onto the pre-paid cards. Or, this can be done using vouchers purchased by the consumers (from participating merchants), where the monetary values associated with the vouchers are then transferred by the consumers to the payment accounts. In either case, the monetary value loaded to the pre-paid cards can then be used to complete the payment transactions with the merchants. Typically, when the vouchers are used to load value to the pre-paid cards, the consumers must purchase the vouchers from specific providers associated with issuance of the pre-paid cards, as vouchers from other providers may not be compatible with the consumers' particular pre-paid cards. Uniquely, systems and methods described herein allow the consumers to purchase vouchers from various different providers and transfer the values from the vouchers to their pre-paid cards, regardless of the issuers of the cards.

Figure 1:
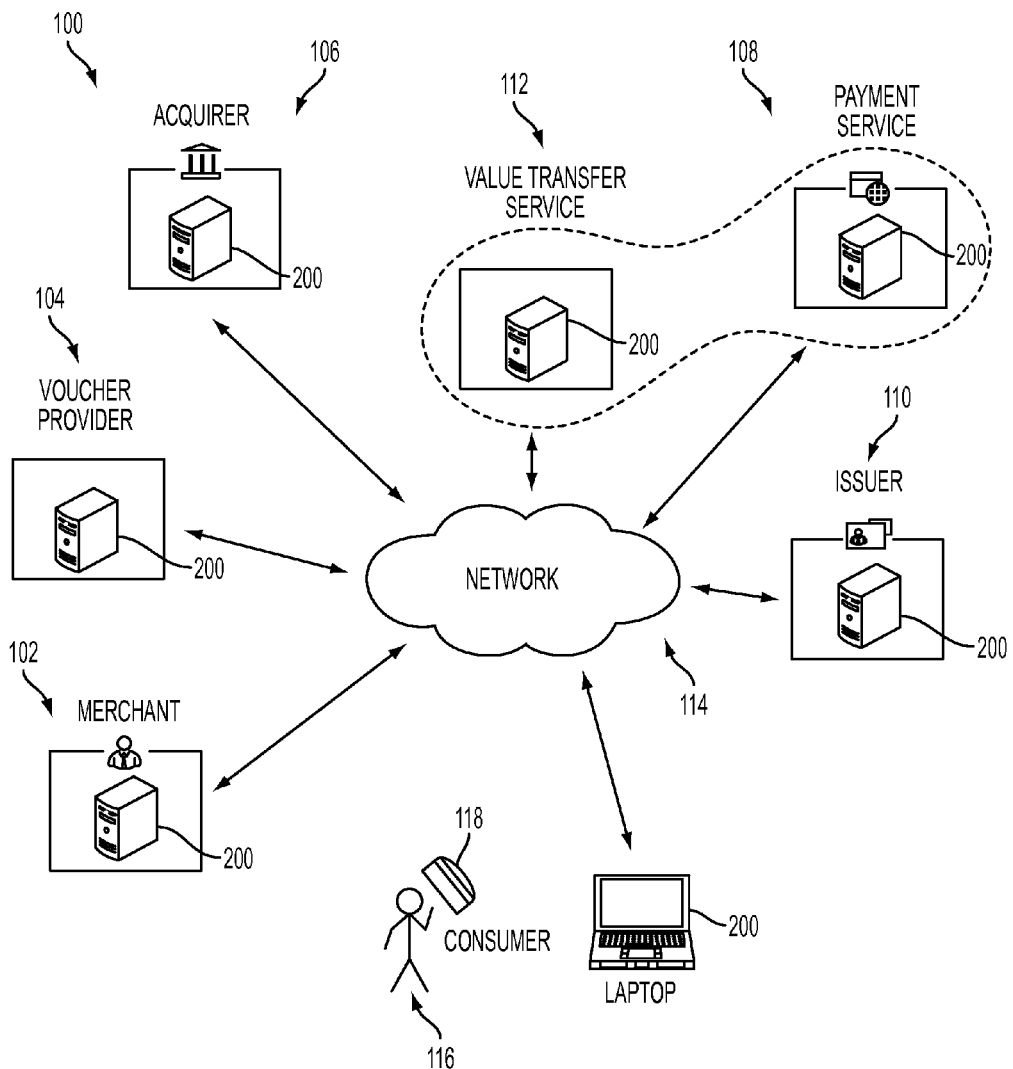
FIG. 1 is a block diagram of an exemplary system of the present disclosure suitable for use in transferring value to payment accounts.

With reference now to the drawings, FIG. 1 illustrates an exemplary system 100, in which one or more aspects of the present disclosure may be implemented. Although components of the system 100 are presented in one arrangement, it should be appreciated that other exemplary embodiments may include the same or different components arranged otherwise, for example, depending on associations between various entities of the system 100, etc.

The illustrated system 100 generally includes a merchant 102, a voucher provider 104, an acquirer 106 associated with the merchant 102 and the voucher provider 104, a payment service 108, a payment device issuer 110, and a value transfer service 112, each coupled to network 114. The network 114 may include, without limitation, a wired and/or wireless network, one or more local area network (LAN), wide area network (WAN) (e.g., the Internet, etc.), other network as described herein, and/or other suitable public and/or private network capable of supporting communication among two or more of the illustrated components, or any combination thereof. In one example, the network 114 includes multiple networks, where different ones of the multiple networks are accessible to different ones of the illustrated components in FIG. 1.

Generally, in the system 100, a consumer 116 is issued a payment device 118 by the issuer 110. The payment device 118 is associated with a payment account where, upon use of the payment device 118 to perform a payment transaction (e.g., with the merchant 102, with another merchant, etc.), the value of the transaction is deducted from the payment account. In the illustrated embodiment, the payment device 118 is a pre-paid payment device requiring value (e.g., cash, credits, etc.) to be present in the associated payment account prior to use of the payment device 118. When the value in the payment account is depleted, the consumer 116 must reload the payment device prior to further use (a line of credit is not associated with the payment device 118 in the illustrated embodiment). With the said, the payment device 118 may include any suitable pre-paid payment device such as, for example, a pre-paid card, a debit card, or another enabled device used to provide an account number (e.g., a mobile phone, a tablet, etc.), etc.

To provide value to the payment account associated with the payment device 118 (e.g., to load, reload, etc. the payment account, etc.), prior to use of the payment device 118, the consumer 116 can utilize either a voucher solution or a point of sale (POS) solution. In connection with the voucher solution, the consumer 116 purchases a voucher, from the merchant 102 (or another source), with a desired value to be placed in the payment account. The voucher is initially provided to the merchant 102 by the voucher provider 104, and may or may not be associated with the issuer 110 of the consumer's payment device 118 (e.g., the issuer 110, etc.) (e.g., the voucher can be an open-loop voucher or a closed-loop voucher, etc.). The merchant 102 collects funds (e.g. cash, etc.) from the consumer 116 corresponding to the value of the voucher, and communicates to the voucher provider 104, via the network 114, a voucher identification number (VID) for the purchased voucher and the value of the voucher. Using this data, the voucher provider 104 activates the voucher in the desired value, and communicates, via the network 114, an activation confirmation back to the merchant 102. The merchant 102 then provides a voucher activation receipt to the consumer 116, indicating the VID and the voucher value, for the purchased voucher.

Then, to transfer the value of the voucher (in total or in part) to the payment account associated with the payment device 118, the consumer 116 submits a request (e.g., a transfer request, a load request, etc.) to the value transfer service 112. In so doing, the consumer 116 identifies the voucher provider 104 (the specific provider of the purchased voucher), and/or provides data to identify the purchased voucher (e.g., the VID, etc. which may then also be used to identify the voucher provider 104, etc.) and the payment account.

As an example, the value transfer service 112 may include a website accessible to the consumer 116, via the network 114. Upon accessing the website, various interfaces may be displayed for use by the consumer 116 to identify the particular voucher provider 104 (e.g., from a predefined list of other different voucher providers, etc.), to enter the VID, and to enter a payment account number. As another example, the value transfer service 112 may be associated with a particular phone number (and, in some aspects, may also include an interactive voice response (IVR) system, etc.). The consumer 116 may then call or text the phone number and provide the VID to the value transfer service 112 in connection with the request to transfer the value of the voucher to the consumer's payment account. In one aspect, the consumer 116 may also provide the payment account number, with the call or text, to which the value of the voucher is to be transferred. In another aspect, the consumer 116 may instead provide a phone number with the call or text (or the value transfer service 112 may automatically recognize the phone number from which the call is being sent), which is then used to identify the payment account to which the value of the voucher is to be transferred (e.g., the value transfer service 112 may convert the phone number to the payment account number via a conversion table that lists phone numbers and associated payment account numbers, etc.).

In some aspects, after receiving the request from the consumer 116, the value transfer service 112 may perform a check of the validity and/or value of the voucher identified by the consumer 116 before transferring the value of the voucher. As an example, the value transfer service 112 may communicate data relating to the voucher (as received from the consumer 116) to the voucher provider 104, via the network 114, for verification. If the voucher data is valid, the voucher provider 104 may then communicate a confirmation back to the value transfer service 112. Alternatively, if the voucher data is invalid (e.g., the VID is invalid, the voucher value is invalid, etc.), the voucher provider 104 may then communicate a warning back to the value transfer service 112 (and, in some embodiments, may flag the voucher as invalid, etc.).

Upon receiving the request from the consumer 116 (and upon receiving a confirmation of validity form the voucher provider 104 in aspects where validity of the voucher is checked), the value transfer service 112 communicates a transaction request, via the network 114, to the acquirer 106 for the voucher value. In turn, the acquirer 106 generates a payment request and communicates it through the payment service 108 to the issuer 110 (e.g., through a credit card payment system using the MasterCard® interchange, etc.). The issuer 110 then processes the payment request and, if valid (e.g., if the VID and the voucher value match data generated by the voucher provide when the voucher was purchased, etc.), approves the request and transfers the voucher value to the consumer's payment account. The issuer 110 then communicates an authorization response, containing the updated value balance of the payment account, back to the value transfer service 112 (again through the payment service 108 and the acquirer 106). And, when the authorization response is received, the value transfer service 112 confirms, to the consumer 116, that the voucher value has been transferred to the consumer's payment account.

With continued reference to FIG. 1, in connection with the POS solution for providing value to the payment account associated with the payment device 118, the consumer 116 initially contacts the merchant 102 (e.g., in person) with a transaction request to directly provide value to the consumer's payment account. The merchant 102 collects the desired value, from the consumer 116, to be provided to the payment account, in the form of a cash payment, and enters the value into a POS terminal. The merchant 102 then communicates, via the POS terminal, a request to the acquirer 106 for the amount of the value to be provided to the consumer's payment account. In turn, the acquirer 106 generates a payment request and communicates it through the payment service 108 to the issuer 110 (e.g., through the credit card payment system using the MasterCard® interchange, etc.). The issuer 110 then processes the payment request and, if valid (e.g., if the payment account is valid, etc.), approves the request and transfers the desired value to the consumer's payment account. The issuer 110 then communicates an authorization response, containing the updated value balance of the payment account, back to the merchant 102 (and particularly to the POS terminal), again through the payment service 108 and the acquirer 106. And, when the authorization response is received, the merchant 102 confirms, to the consumer 116 (e.g., via the POS terminal, etc.), that the voucher value has been transferred to the consumer's payment account and provides the consumer 116 with a receipt indicating the transaction details (e.g., the value amount provided to the consumer's payment account, the payment account balance, etc.).

Once value is provided to the payment account associated with the payment device 118 (in any of the above manners), the payment device 118 can be used in a payment transaction, for example, as follows. The consumer 116 presents the payment device 118 to the merchant 102 (or another merchant as use of the payment device 118 is not limited to any particular merchant (i.e., use of the payment device 118 is not limited to the merchant 102 at which the value was added to the payment account associated with the payment device 118), etc.). In response, the merchant 102 reads the payment device 118 (and, in some cases, requests a personal identification number (PIN) to authorize the payment device 118) and communicates, via the network 114, an authorization request, including details of the transaction, to the acquirer 106 (assuming the acquirer 106 is also associated with the merchant 102) to determine whether the payment device 118 is in good standing and whether there is sufficient value in the corresponding payment account to complete the transaction. Following receipt of the authorization request, the acquirer 106, in turn, communicates with the issuer 110, through the payment service 108 (e.g., again through the credit card payment system using the MasterCard® interchange, etc.), for authorization to complete the transaction. If the issuer 110 accepts the transaction, an authorization is provided back to the merchant 102 and the merchant 102 completes the transaction.

While a single consumer 116 is shown in the system 100 of FIG. 1, it should be appreciated that the system 100 can accommodate multiple different consumers. Likewise, while one merchant 102 is shown in the system 100 of FIG. 1, it should be appreciated that any number of merchants may be included, and accommodated by the system 100. Further, while a single voucher provider 104 is shown in the system 100, it should be appreciated that any number of voucher providers may be included, and accommodated by the system 100, including the value transfer service 112.

Figure 2:
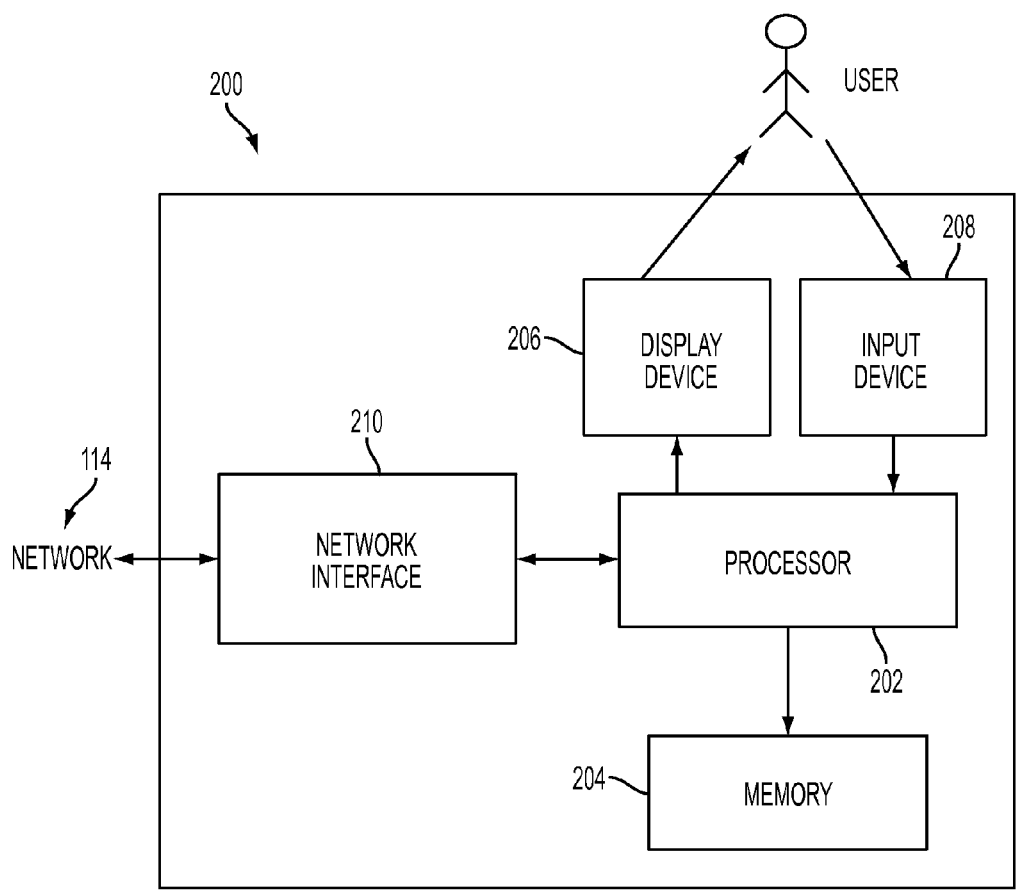
FIG. 2 is a block diagram of a computing device, that may be used in the exemplary system of FIG. 1.

FIG. 2 illustrates an exemplary computing device 200. In the exemplary embodiment of FIG. 1, each of the merchant 102, the voucher provider 104, the acquirer 106, the payment service 108, the issuer 110, the value transfer service 112, and the consumer 116 are illustrated as including or being associated with a computing device 200. In addition, it should also be appreciated that, while not illustrated, the payment device 118 of the consumer 116 may be associated with a computing device 200. With that said, the computing device 200 may include, for example, one or more servers, personal computers, laptops, tablets, PDAs, telephones (e.g., cellular phones, smartphones, other phones, etc.), POS terminals, etc. as appropriate.

The system 100, and its components, however, should not be considered to be limited to the computing device 200, as described below, as different computing devices and/or arrangements of computing devices may be used. In addition, different components and/or arrangements of components may be used in other computing devices. Further, in various exemplary embodiments the computing device 200 may include multiple computing devices located in close proximity, or distributed over a geographic region. Additionally, each computing device 200 may be coupled to a network (e.g., the Internet, an intranet, a private or public LAN, WAN, mobile network, telecommunication networks, combinations thereof, or other suitable network, etc.) that is either part of the network 114, or separate therefrom.

The exemplary computing device 200 includes a processor 202 and a memory 204 that is coupled to the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor.

The memory 204, as described herein, is one or more devices that enable information, such as executable instructions and/or other data, to be stored and retrieved. The memory 204 may include one or more computer-readable media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, flash drives, hard disks, and/or any other type of volatile or nonvolatile physical or tangible computer-readable media. The memory 204 may be configured to store, without limitation, voucher data (e.g., account data for the voucher provider 104, VIDs for vouchers issued by the voucher provider 104, voucher values for the issued vouchers, etc.), payment account data for the consumer 116, payment transaction data, data for voucher providers, and/or other types of data suitable for use as described herein, etc. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable media. It should be appreciated that the memory 204 may include a variety of different memories, each implemented in one or more of the functions or processes described herein.

In the exemplary embodiment, the computing device 200 includes a display device 206 that is coupled to the processor 202. The display device 206 outputs to a user (e.g., the consumer 116, individuals associated with the merchant 102, individuals associated with the voucher provider 104, individuals associated with the acquirer 106, individuals associated with the payment service 108, individuals associated with the issuer 110, individuals associated with the value transfer service 112, etc.) by, for example, displaying and/or otherwise outputting information such as, but not limited to, voucher data (e.g., account data for the voucher provider 104, VIDs for vouchers issued by the voucher provider 104, voucher values for the issued vouchers, etc.), payment account data for the consumer 116, payment transaction data, and/or any other type of data. It should be further appreciated that various interfaces (e.g., webpages, etc.) may be displayed at computing device 200, and in particular at display device 206, to display such information, etc. And in some cases, the computing device 200 may cause the interfaces to be displayed at the display device 206 of another computing device, including, for example, a server hosting a website (e.g., the website associated with the value transfer service 112, etc.) having multiple webpages, etc. Display device 206 may include, without limitation, a cathode ray tube (CRT), a liquid crystal display (LCD), a light-emitting diode (LED) display, an organic LED (OLED) display, and/or an "electronic ink" display. In some embodiments, display device 206 includes multiple devices.

The computing device 200 also includes an input device 208 that receives input from the user. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both display device 206 and input device 208.

In addition, the illustrated computing device 200 also includes a network interface 210 coupled to the processor 202 and the memory 204. The network interface 210 may include, without limitation, a wired network adapter, a wireless network adapter, a mobile telecommunications adapter, or other device capable of communicating to one or more different networks, including the network 114. In some exemplary embodiments, the computing device 200 includes the processor 202 and one or more network interfaces incorporated into or with the processor 202.

Figure 3:
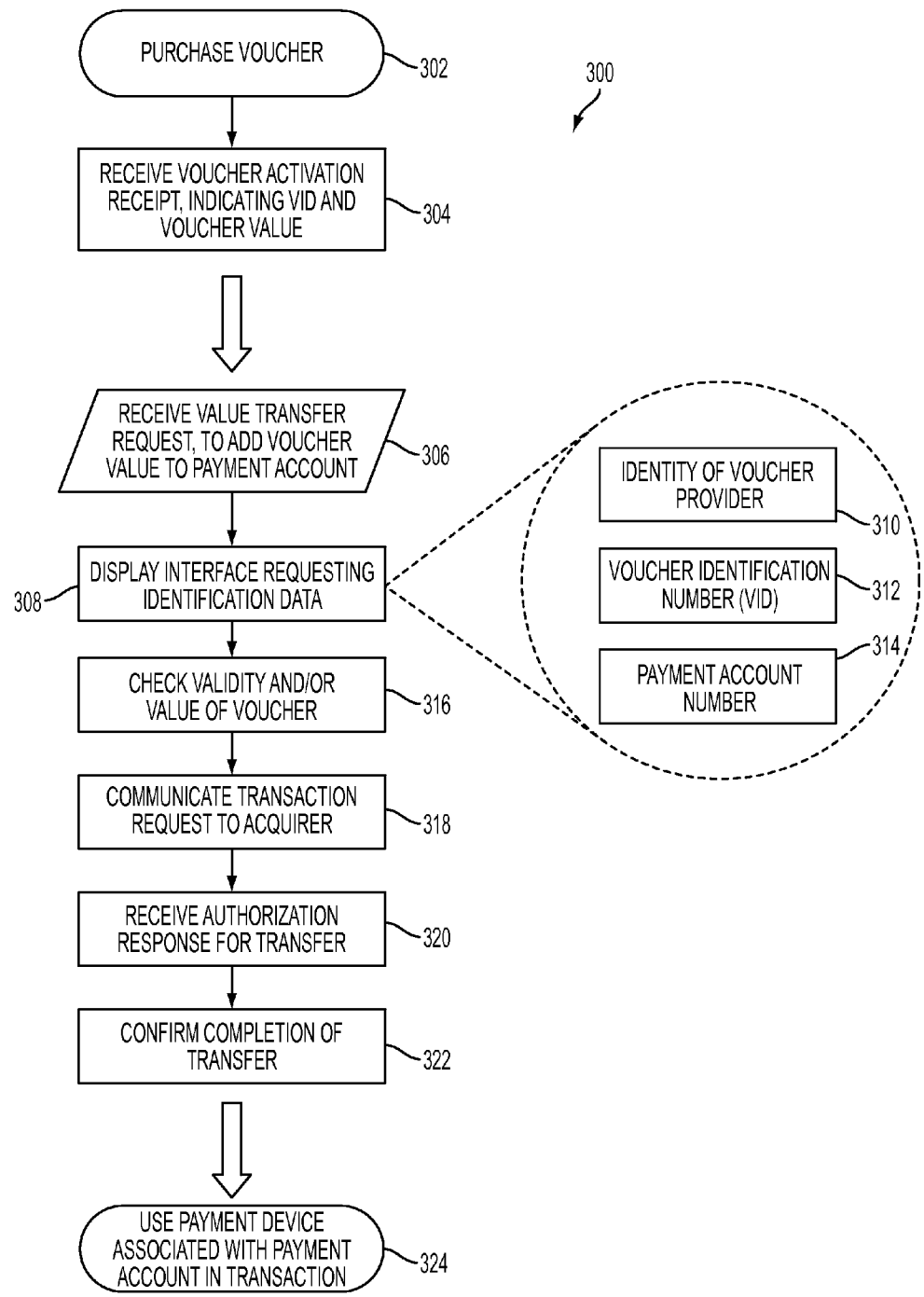
FIG. 3 is an exemplary method for use in transferring value to the payment accounts from vouchers.

FIG. 3 illustrates an exemplary method at 300 for transferring value from vouchers to payment accounts. The exemplary method 300 is described as implemented in the value transfer service 112 of the system 100, with further reference to the merchant 102, the voucher provider 104, the acquirer 106, the payment service 108, the issuer 110, and the consumer 116 (and the interactions therebetween). In at least some embodiments, it is contemplated that the value transfer service 112 may be included with (or implemented by) the payment service 108 (as illustrated by the broken lines in FIG. 1). In other embodiments, the value transfer service 112 may be stand alone, or associated with other entities, shown or not shown in FIG. 1, such as the voucher provider 104, the acquirer 106, the issuer 110, or other entities involved in payment transactions or not.

Further, for purposes of illustration, the exemplary method 300 is described herein with reference to the computing device 200. And, just as the methods herein should not be understood to be limited to the exemplary system 100, or the exemplary computing device 200, the systems and the computing devices herein should not be understood to be limited to the exemplary method 300.

As previously described, the consumer 116 is initially issued the payment device 118 by the issuer 110. And, the payment device 118 is associated with the payment account where, upon use of the payment device 118 to perform a payment transaction (e.g., with the merchant 102, with another merchant, etc.), the value of the transaction is deducted from the payment account.

As shown in FIG. 3, when desired to provide value to the payment account associated with the payment device 118 (e.g., load, reload, etc. the payment account), the consumer 116 purchases a voucher from the merchant 102, at 302, with a desired value to be placed in the payment account. As part of the purchase transaction, the merchant 102 collects funds (e.g. cash, etc.) from the consumer 116 corresponding to the value of the voucher. In addition, the merchant 102 communicates a VID for the voucher and a value of the voucher to the voucher provider 104, via the network 114. Using this data, the voucher provider 104 activates the voucher in the desired value and communicates, via the network 114, an activation confirmation back to the merchant 102. The voucher provider 104 also stores data for the activated voucher in the memory 204 of the computing device 200 associated therewith for subsequent use/verification. The merchant 102 then provides a voucher activation receipt to the consumer 116, at 304, indicating the VID and the voucher value.

With that said, it should be appreciated that the voucher purchased by the consumer 116 at the merchant 102 is originally provided to the merchant 102 by the voucher provider 104. And, in the illustrated method 300, the voucher provider 104 is not associated with the issuer 110 of the consumer's payment device 118 (e.g., the issuer 110, etc.). In addition, the purchased voucher, in some cases, may be an open-loop voucher. As such, the voucher itself may be used by the consumer 116 as a payment device (independent of the payment device 118), or in connection with the payment device 118 as described. Further, in the illustrated embodiment, the voucher is an open-loop voucher such that it can be used by the consumer 116 for the payment device 118, regardless of the voucher provider and independent of an issuer of the payment device 118. In other exemplary embodiments, however, the voucher may be a closed-loop voucher (e.g., a voucher provided by particular voucher providers and only useable with specific services, service providers or merchants, etc.).

Next, to transfer the value of the voucher to the payment account associated with the payment device 118 (in total or in part) (when used in such a manner), the consumer 116 submits a request (e.g., a transfer request, a load request, etc.) to the value transfer service 112, via the network 114, for a load transaction, and the value transfer service 112 receives the request at the computing device 200 at 306. As part of this request, the value transfer service 112 causes (e.g., the processor 202 of the computing device 200 of the value transfer service 112 causes, etc.) an interface to display at the consumer's computing device 200, at 308, for use in collecting identification data for the voucher and the payment account. In addition, the value transfer service 112 identifies multiple different available voucher providers (whose vouchers can be accepted through the value transfer service 112 to transfer value to the payment account associated with the customer), stored in the memory 204 of the computing device 200, from which the consumer 116 can select as being the provider of the consumer's purchased voucher. In so doing, the value transfer service 112 then also receives from the consumer 116, either together (e.g., in the single request, etc.) or individually (e.g., in multiple separate requests, etc.), the identity of the voucher provider 104 associated with the voucher at 310 (as selected from the available options provided by the value transfer service 112), the VIN at 312, and the payment account number at 314.

Figure 4:
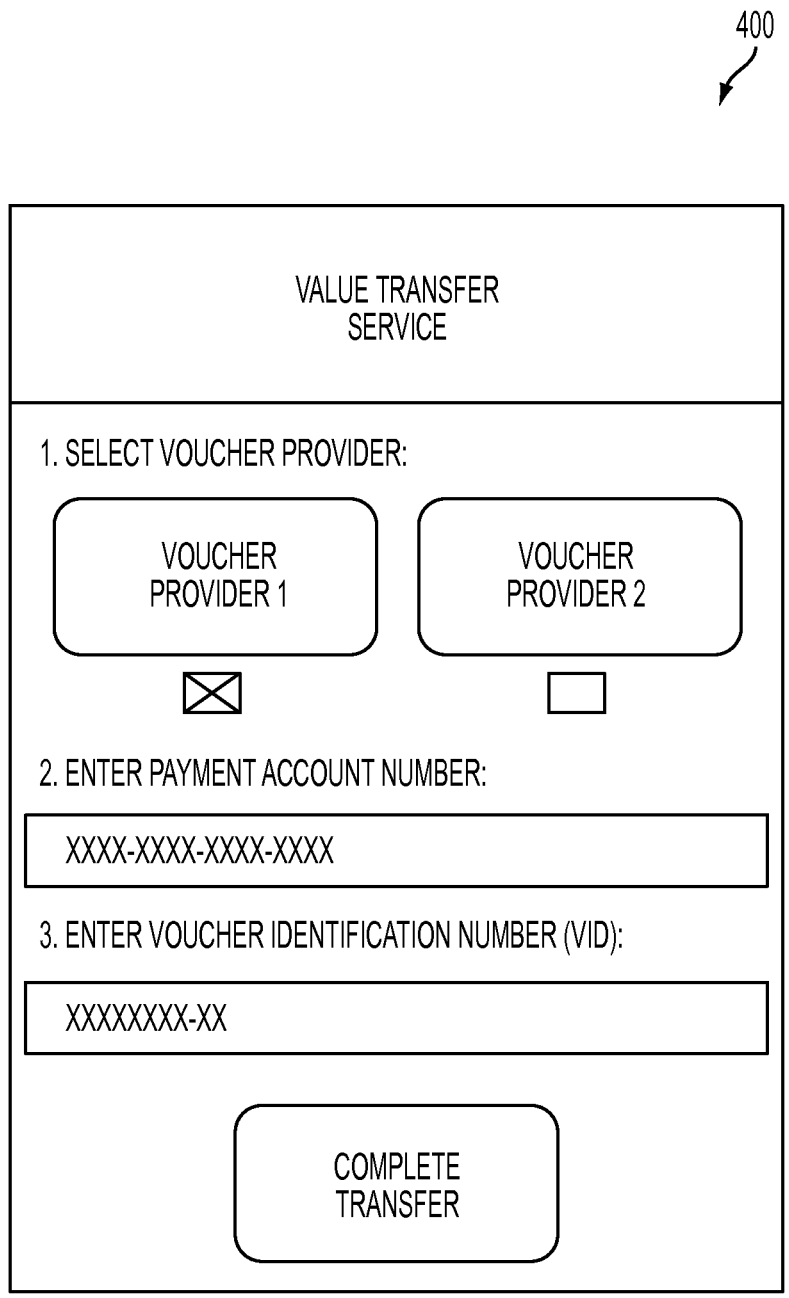
FIG. 4 is an exemplary portion of an interface that can be displayed at the computing device in connection with the system of FIG. 1 and/or the method of FIG. 3.

As an example, FIG. 4 illustrates an exemplary portion of an interface 400 that can be displayed by the value transfer service 112 at the computing device 200 of the consumer 116, following receipt of the consumer's transfer request, for use in receiving the identification data for the voucher and the payment account. In this example, the value transfer service 112 (and particularly the processor 102 of the value transfer service's computing device 200) identifies two different available voucher providers (voucher provider 1 and voucher provider 2) from memory 204 for display to the consumer 116. An option is then provided to the consumer 116 to initially select one of the two voucher providers for the consumer's purchased voucher. Following this selection, the consumer 116 can then enter the VIN and the payment account number to complete the transfer transaction.

As described above, in some embodiments the value transfer service 112 may be associated with a particular phone number. Here, instead of displaying an interface at 308, the value transfer service may instead support receipt of a phone call or text from the consumer 116 where the consumer 116 can identify the voucher provider 104 and/or provide the VID to the value transfer service 112. In addition, consumer 116 may then also provide the payment account number, with the call or text, to which the value of the voucher is to be transferred. Or, the consumer 116 may then also provide a phone number with the call or text (or the value transfer service 112 may automatically recognize the phone number from which the call is being sent), which is then used to identify the payment account to which the value of the voucher is to be transferred.

With continued reference to FIG. 3, after receiving the request from the consumer 116 at 306 (and after identifying the voucher provider and/or VID at 308), the value transfer service 112 then performs a check of the validity and/or a check of the value of the voucher identified by the consumer 116, at 316, before transferring the value of the voucher. In so doing, the value transfer service 112 communicates data relating to the voucher (as received from the consumer 116) to the voucher provider 104, via the network 114, for verification. If the data is valid, the voucher provider 104 then communicates a confirmation back to the value transfer service 112 that the voucher is valid. Alternatively, if the data is invalid (e.g., if the VID is invalid, if the voucher value valid is invalid, etc.), the voucher provider 104 then communicates a warning back to the value transfer service 112.

Upon receiving the request from the consumer 116 at 306 (and upon receiving a confirmation of validity form the voucher provider 104 where validity of the voucher is checked at 316), the value transfer service 112 communicates a transaction request, at 318, via the network 114, to the acquirer 106 for the voucher value to be added to the consumer's payment account. In turn, the acquirer 106 generates a payment request and communicates it, through the payment service 108 to the issuer 110 (e.g., again, through the credit card payment system using the Master-Card® interchange, etc.). The issuer 110 then processes the payment request and, if valid (e.g., if the VID and the voucher value match data generated by the voucher provider 104 when the voucher was purchased during the confirmation check described above, etc.), approves the request and transfers the voucher value to the consumer's payment account. Following the transfer, the issuer 110 communicates an authorization response, containing the updated value balance of the payment account, back to the value transfer service 112 (and the value transfer service 112 receives the authorization response at 320), again through the payment service 108 and the acquirer 106. And, the value transfer service 112 then confirms to the consumer 116, at 322, that the voucher value has been transferred to the consumer's payment account. The payment device 118 can then be used, at 324, in a payment transaction, for example, as described above in connection with the system 100.

In some embodiments, the computing device 200 associated with the consumer 116 includes a mobile computing device with an application for transferring value from a voucher to the payment account associated with the consumer 116 and the payment device 118 (e.g., in accordance with the system 100, the method 300, etc.). For example, the memory 204 of the computing device 200, and specifically, the non-transitory computer readable media, includes computer-executable instructions that when executed by the processor 202 cause the processor 202 to transfer the value of the voucher to the consumer's payment account. For example, using the application, which may communicate with the computing device 200 of the value transfer service 112 via any available communication type (e.g., email, text message, etc.), the consumer 116 may request the transfer, view transfer confirmations, and view balance details of the payment account.

In other exemplary embodiments, methods are provided for transferring value to payment accounts using POS terminals (e.g., in connection with system 100, or not; etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving a load request to transfer value from a voucher to a payment account associated with a consumer, where the load request includes a selection of a provider associated with the voucher, from multiple different available voucher providers, (b) communicating a transaction request to transfer the value from the voucher to the payment account, where the transaction request includes an identification number for the voucher and an account number for the payment account, (c) generating a confirmation that the value from the voucher has been transferred to the payment account, when a transfer authorization is received at the computing device in response to the transaction request, (d) identifying an acquirer associated with the selected voucher provider, and (e) receiving the transfer authorization from the identified acquirer in response to the transaction request.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for transferring value from a voucher to a payment account associated with a consumer, the method comprising:
receiving, at a computing device, a load request to transfer value from a voucher to a payment account associated with a consumer, the load request including a selection of a provider associated with the voucher from multiple different available voucher providers;
communicating, by the computing device, a transaction request to transfer the value from the voucher to the payment account, the transaction request including an identification number for the voucher and an account number for the payment account;
generating, by the computing device, a confirmation that the value from the voucher has been transferred to the payment account, when a transfer authorization is received at the computing device in response to the transaction request.

2. The method of claim 1, further comprising identifying, by the computing device, an acquirer associated with the selected voucher provider.

3. The method of claim 2, wherein communicating the transaction request includes communicating the transaction request to the identified acquirer.

4. The method of claim 3, further comprising receiving the transfer authorization at the computing device from the identified acquirer in response to the transaction request.

5. The method of claim 1, wherein the confirmation includes at least one of the value transferred to the payment account and a value balance of the payment account.

6. The method of claim 1, wherein the payment account is associated with a payment device selected from the group consisting of a pre-paid card, a debit card, and a smart phone.

7. The method of claim 6, wherein the payment device is independent of the selected voucher provider.

8. The method of claim 6, wherein the voucher is an open-loop voucher.

9. The method of claim 1, wherein the value includes a cash value, and wherein the confirmation includes an indication of the payment account to which the cash value was loaded and an indication of the cash value.

10. The method of claim 1, further comprising confirming validity of the voucher, prior to communicating the transaction request to transfer the value from the voucher to the payment account.

11. A system for transferring value from a voucher to a payment account associated with a consumer, the system comprising:
a memory configured to store data for multiple different voucher providers; and
a processor coupled to the memory, the processor configured to:
identify one of the multiple different voucher providers stored in the memory, in response to a request from a consumer to transfer value from a voucher to a payment account, the identified voucher provider being associated with the voucher;
after the voucher provider is identified, request an account number for the payment account and an identification for the voucher;
communicate a transaction request, to an issuer of the payment account, to transfer at least part of a value associated with the voucher to the payment account; and
when a transfer authorization is received from the issuer approving the transaction request, cause a confirmation to be displayed to the consumer that indicates the transfer is complete.

12. The system of claim 11, wherein the confirmation includes at least one of the value transferred to the payment account and a value balance of the payment account.

13. The system of claim 11, wherein the payment account is associated with a payment device selected from the group consisting of a pre-paid card, a debit card, and a smart phone.

14. The system of claim 13, wherein the payment device is independent of the selected voucher provider.

15. The system of claim 14, wherein the voucher is an open-loop voucher.

16. A non-transitory computer readable media comprising instructions that, when executed by at least one processor, cause the at least one processor to:
in response to a load request to transfer value from a voucher to a payment account associated with a customer, identify multiple different available voucher providers from which vouchers can be accepted to transfer value to the payment account associated with the customer;
when one of the multiple different available voucher providers is selected, request an account number for the payment account associated with the customer and an identification for the voucher;
communicate a request to the selected voucher provider to confirm validity of the voucher and/or a value of the voucher to be transferred;
when validation is received from the selected voucher provider, communicate a transaction request, to an issuer of the payment account, to transfer at least part of the value associated with the voucher to the payment account; and
when a transfer authorization is received from the issuer approving the transaction request, cause a confirmation to be displayed to the consumer indicating that the transfer is complete.

17. The non-transitory computer readable media of claim 16, wherein the confirmation includes at least one of the value transferred to the payment account and a value balance of the payment account.

18. The non-transitory computer readable media of claim 16, wherein the payment account is associated with a payment device selected from the group consisting of a pre-paid card, a debit card, and a smart phone.

19. The non-transitory computer readable media of claim 18, wherein the payment device is independent of the selected voucher provider.

20. The non-transitory computer readable media of claim 19, wherein the voucher is an open-loop voucher.

* * * * *